United States Patent
Tanabe

(10) Patent No.: US 9,074,532 B2
(45) Date of Patent: Jul. 7, 2015

(54) POWER GENERATION PLANT

(75) Inventor: Hiroshi Tanabe, Tokyo (JP)

(73) Assignee: MITSUBISHI HITACHI POWER SYSTEMS, LTD., Yokohama-shi (JP)

(*) Notice: Subject to any disclaimer, the term of this patent is extended or adjusted under 35 U.S.C. 154(b) by 763 days.

(21) Appl. No.: 13/354,698

(22) Filed: Jan. 20, 2012

(65) Prior Publication Data

US 2012/0186263 A1 Jul. 26, 2012

(30) Foreign Application Priority Data

Jan. 21, 2011 (JP) ................................ 2011-011100

(51) Int. Cl.
*F02C 7/22* (2006.01)
*F02C 3/30* (2006.01)
*F02C 3/20* (2006.01)

(52) U.S. Cl.
CPC ... *F02C 7/22* (2013.01); *F02C 3/30* (2013.01); *F02C 3/20* (2013.01)

(58) Field of Classification Search
CPC ......... F01K 21/00; F21K 21/04; F23D 14/68; F02C 3/20; F02C 3/22; F02C 3/30; F02C 3/305; F02C 7/22
See application file for complete search history.

(56) References Cited

U.S. PATENT DOCUMENTS

| | | | |
|---|---|---|---|
| 6,357,218 B1 * | 3/2002 | Ranasinghe et al. | 60/775 |
| 6,370,880 B1 * | 4/2002 | Smith et al. | 60/775 |
| 6,502,402 B1 * | 1/2003 | Smith et al. | 60/775 |
| 6,694,744 B1 | 2/2004 | Smith | |
| 7,788,930 B2 * | 9/2010 | Aiton et al. | 60/775 |

FOREIGN PATENT DOCUMENTS

| | | |
|---|---|---|
| JP | 54-009041 A | 1/1979 |
| JP | 60-232492 A | 11/1985 |
| JP | 01-21153 Y2 | 5/1986 |
| JP | 9-079046 A | 3/1997 |
| JP | 2004-513289 A | 4/2004 |
| JP | 2006-57894 A | 3/2006 |
| JP | 2008-209070 A | 9/2008 |

OTHER PUBLICATIONS

Decision to Grant a Patent dated May 7, 2014, issued in Japanese Patent Application No. 2012-553702, with Concise Explanation of Relevance (4 pages).
Korean Decision to Grant a Patent dated Jun. 23, 2014, issued in corresponding Korean Patent Application No. 10-2013-7001475 (2 pages), "The Decision to Grant a Patent has been received".

(Continued)

*Primary Examiner* — Ehud Gartenberg
*Assistant Examiner* — Arun Goyal
(74) *Attorney, Agent, or Firm* — Westerman, Hattori, Daniels & Adrian, LLP

(57) ABSTRACT

A power-generation plant 10 including a gas turbine 11; a fuel-gas cooler 13; and an extraction line 24 that guides the fuel gas extracted from an intermediate stage of a fuel-gas compressor 12 to the fuel-gas cooler 13; a first level detector 61 that detects whether a level of the coolant accumulated at a bottom portion of the fuel-gas cooler 13 has reached a predetermined level; and a controller that stops the gas turbine 11 on the basis of a detection signal sent from the first level detector 61 and that outputs a command signal for stopping a coolant pump 53 that supplies the coolant to the spray nozzles 44 and 45.

6 Claims, 3 Drawing Sheets

(56) References Cited

OTHER PUBLICATIONS

International Search Report of PCT/JP2012/050692, date of mailing Feb. 21, 2012.(w/partial translation).

Notice of Allowance dated Dec. 15, 2014, issued in corresponding Korean Patent Application No. 10-2014-7007083 (2 pages) "The Notice of Allowance has been received".

* cited by examiner

POWER GENERATION PLANT

CROSS-REFERENCE TO RELATED APPLICATIONS

This application is based on Japanese Patent Application No. 2011-011100, the contents of which are incorporated herein by reference.

BACKGROUND OF THE INVENTION

1. Field of the Invention

The present invention relates to a power-generation plant provided with a gas turbine that uses low-calorific-value gas, such as blast furnace gas (BFG) or the like, as fuel and to a fuel-gas cooler that cools fuel gas pressurized at a fuel-gas compressor and recirculated.

2. Description of Related Art

There is a known power-generation plant provided with a gas turbine that uses low-calorific-value gas, such as blast furnace gas (BFG) or the like, as fuel and a fuel-gas cooler that cools fuel gas pressurized at a fuel-gas compressor recirculated, for example, as disclosed in Japanese Unexamined Patent Application, Publication No. Hei 9-79046.

In addition, there is a known fuel-gas cooler in which fuel gas is cooled by spraying coolant from a spray nozzle; the coolant, once it has been sprayed from the spray nozzle, used to cool the fuel gas, and then dripped, is recovered with a hopper; and the recovered coolant is recirculated.

However, low-calorific-value gas, such as blast furnace gas (BFG) or the like, contains a large amount of contaminants, and there is a problem in that the contaminants may gradually be deposited at an outlet (bottom portion) of the hopper, thus blocking the outlet of the hopper, and the contaminants may be deposited inside a pipe that guides the coolant accumulated in the hopper to a coolant pit or at an outlet of the pipe, thus blocking the interior of the pipe or the outlet of the pipe. There is also a problem in that, once the outlet of the hopper, the interior of the pipe, or the outlet of the pipe is blocked, it may become impossible to recover the coolant that has been sprayed from the spray nozzle, used to cool the fuel gas, and then dripped, with the hopper alone; the coolant may overflow from the hopper and may flow into a pipe (bypass line) that guides the fuel gas pressurized at the fuel-gas compressor to the fuel-gas cooler or a pipe (extraction line) that extracts the fuel gas from an intermediate stage of the fuel-gas compressor to guide it to the fuel-gas cooler; the coolant may flow into the fuel-gas compressor and the gas turbine when the power-generation plant is stopped; and thus, the fuel-gas compressor and the gas turbine may be damaged.

In addition, in cold regions, etc., in the case in which the power-generation plant is in a stopped state and, in addition, the outdoor temperature falls to 0° C. or below, a coolant pump is operated to spray the coolant from the spray nozzle, thus circulating the coolant in order to prevent the coolant used in the fuel-gas cooler from freezing. However, there is a problem in that, if the coolant is sprayed into the fuel-gas cooler when the power-generation plant is in the stopped state (that is, a state in which high-temperature, high-pressure fuel gas is not supplied (does not flow in)), the interior of the fuel-gas cooler may immediately become over-saturated; droplets may form everywhere in the fuel-gas cooler, thus forming a body of liquid; the liquid may flow into the fuel-gas compressor and the gas turbine by flowing in reverse through the pipe (bypass line) that guides the fuel gas pressurized at the fuel-gas compressor to the fuel-gas cooler or the pipe (extraction line) that extracts the fuel gas from the intermediate stage of the fuel-gas compressor to guide it to the fuel-gas cooler; and thus, the fuel-gas compressor and the gas turbine may be damaged.

BRIEF SUMMARY OF THE INVENTION

The present invention has been conceived in light of the above-described circumstances, and an object thereof is to provide a power-generation plant provided with a fuel-gas cooler and a gas turbine, which is capable of preventing coolant used in the fuel-gas cooler from flowing into a fuel-gas compressor and the gas turbine by flowing in reverse through a pipe (bypass line) that guides fuel gas pressurized at the fuel-gas compressor to the fuel-gas cooler or a pipe (extraction line) that extracts the fuel gas from an intermediate stage of the fuel-gas compressor to guide the fuel gas to the fuel-gas cooler.

The present invention employs the following solutions in order to solve the above-described problems.

A power-generation plant according to the present invention is a power-generation plant including a gas turbine that combusts fuel gas; a fuel-gas cooler that cools the fuel gas, which is pressurized at a fuel-gas compressor and recirculated, with coolant sprayed from a spray nozzle; an extraction line that guides the fuel gas extracted from an intermediate stage of the fuel-gas compressor to the fuel-gas cooler; a first level detector that detects whether a level of the coolant accumulated at a bottom portion of the fuel-gas cooler has reached a predetermined level; and a controller that stops the gas turbine on the basis of a detection signal sent from the first level detector and that outputs a command signal for stopping a coolant pump that supplies the coolant to the spray nozzle.

With the power-generation plant according to the present invention, when the first level detector detects that the level of the coolant accumulated in the hopper has reached the predetermined level (a level set at, for example, vertically above (for example, 0 cm above the liquid surface of the coolant accumulated in the hopper) a certain level maintained by a U-shaped pipe and vertically below the bottom end of the downstream end of the extraction line (for example, 0 cm below the bottom end of the downstream end of the extraction line)), the detection signal is output from the first level detector to the controller, and, for example, the command signal is output from the controller to an emergency shut-off valve that blocks the supply of the fuel gas to the gas turbine. Then, the emergency shut-off valve, when the command signal is input thereto from the controller, is quickly closed (set to the fully-closed state), thus blocking the supply of the fuel gas to the gas turbine. At the same time, the controller outputs the command signal to the coolant pump so that the coolant pump is stopped, and, as a result, spraying of the coolant from the spray nozzle is stopped.

Accordingly, the coolant used in the fuel-gas cooler can be prevented from flowing into the fuel-gas compressor and the gas turbine by flowing in reverse through the pipe (extraction line) that extracts the fuel gas from the intermediate stage of the fuel-gas compressor and guides the fuel gas to the fuel-gas cooler.

The above-described power-generation plant more preferably includes a bypass line that guides the fuel gas, which is pressurized at the fuel-gas compressor and recirculated, to the fuel-gas cooler; a second level detector that detects whether a level of the coolant accumulated in the bypass line has reached a predetermined level; and a controller that stops the gas turbine on the basis of a detection signal sent from the second level detector and that outputs a command signal for stopping the coolant pump that supplies the coolant to the spray nozzle.

With such a power-generation plant, when the second level detector detects that the level of the coolant accumulated in the bypass line has reached the predetermined level (a level set at, for example, 10 cm above the bottom end of the inner circumferential surface of the gas inlet pipe), the detection signal is output from the second level detector to the controller, and, for example, the command signal is output from the controller to an emergency shut-off valve that blocks the supply of the fuel gas to the gas turbine. Then, the emergency shut-off valve, when the command signal is input thereto from the controller, is quickly closed (set to the fully-closed state), thus blocking the supply of the fuel gas to the gas turbine. At the same time, the controller outputs the command signal to a coolant pump so that the coolant pump is stopped, and, as a result, spraying of the coolant from the spray nozzle is stopped.

Accordingly, the coolant used in the fuel-gas cooler can be prevented from flowing into the fuel-gas compressor and the gas turbine by flowing in reverse through the pipe (bypass line) that guides the fuel gas pressurized at the fuel-gas compressor to the fuel-gas cooler.

A power-generation plant according to the present invention is a power-generation plant including a gas turbine that combusts fuel gas; a fuel-gas cooler that cools the fuel gas, which is pressurized at a fuel-gas compressor and recirculated, with coolant sprayed from a spray nozzle; and a bypass line that guides the fuel gas, which is pressurized at the fuel-gas compressor and recirculated, to the fuel-gas cooler; a level detector that detects whether a level of the coolant accumulated in the bypass line has reached a predetermined level; and a controller that stops the gas turbine on the basis of a detection signal sent from the level detector and that outputs a command signal for stopping a coolant pump that supplies the coolant to the spray nozzle.

With the power-generation plant according to the present invention, when the level detector detects that the level of the coolant accumulated in the bypass line has reached the predetermined level (a level set at, for example, 10 cm above the bottom end of the inner circumferential surface of the gas inlet pipe), the detection signal is output from the level detector to the controller, and, for example, the command signal is output from the controller to an emergency shut-off valve that blocks the supply of the fuel gas to the gas turbine. Then, the emergency shut-off valve, when the command signal is input thereto from the controller, is quickly closed (set to the fully-closed state), thus blocking the supply of the fuel gas to the gas turbine. At the same time, the controller outputs the command signal to a coolant pump so that the coolant pump is stopped, and, as a result, spraying of the coolant from the spray nozzle is stopped.

Accordingly, the coolant used in the fuel-gas cooler can be prevented from flowing into the fuel-gas compressor and the gas turbine by flowing in reverse through the pipe (bypass line) that guides the fuel gas pressurized at the fuel-gas compressor to the fuel-gas cooler.

In the above-described power-generation plant, it is more preferable that a coolant pipe that supplies the coolant to the spray nozzle be provided, wherein the coolant pipe is provided with a bypass pipe that returns the coolant to the interior of the fuel-gas cooler by bypassing the spray nozzle.

With such a power-generation plant, even in the case in which, in cold regions, etc., the power-generation plant is in a stopped state and, in addition, the outdoor temperature falls to 0° C. or below, the coolant pump is operated without spraying the coolant from the spray nozzle, and thus, the coolant is circulated.

Accordingly, the coolant used in the fuel-gas cooler can be prevented from freezing, and the occurrence of droplets in the fuel-gas cooler can be prevented.

In addition, by suppressing the occurrence of droplets in the fuel-gas cooler, the coolant can be prevented from flowing into the fuel-gas compressor and the gas turbine by flowing in reverse through the pipe (bypass line) that guides the fuel gas pressurized at the fuel-gas compressor to the fuel-gas cooler or the pipe (extraction line) that extracts the fuel gas from the intermediate stage of the fuel-gas compressor and guides it to the fuel-gas cooler.

In the above-described power-generation plant, it is more preferable that a pipe leading to the spray nozzle be provided with a pressure detector for detecting the pressure of the coolant that passes through the pipe.

With such a power-generation plant, it is possible to easily ascertain whether or not the coolant is flowing through the pipe leading to the spray nozzle, that is, whether the coolant is supplied to the spray nozzle or the coolant is supplied to the bypass pipe, and it is possible to prevent forgetting to switch the three-way valve from the spray nozzle side to the bypass pipe side or from the bypass pipe side to the spray nozzle side.

A power-generation plant according to the present invention is a power-generation plant including a gas turbine that combusts fuel gas; a fuel-gas cooler that cools the fuel gas, which is pressurized at a fuel-gas compressor and recirculated, with coolant sprayed from a spray nozzle; and a coolant pipe that supplies the coolant to the spray nozzle, wherein the coolant pipe is provided with a bypass pipe that returns the coolant to the interior of the fuel-gas cooler by bypassing the spray nozzle.

With the power-generation plant according to the present invention, even in the case in which, in cold regions, etc., the power-generation plant is in a stopped state and, in addition, the outdoor temperature falls to 0° C. or below, the coolant pump is operated without spraying the coolant from the spray nozzle, and thus, the coolant is circulated.

Accordingly, the coolant used in the fuel-gas cooler can be prevented from freezing, and the occurrence of droplets in the fuel-gas cooler can be prevented.

In addition, by suppressing the occurrence of droplets in the fuel-gas cooler, the coolant can be prevented from flowing into the fuel-gas compressor and the gas turbine by flowing in reverse through the pipe (bypass line) that guides the fuel gas pressurized at the fuel-gas compressor to the fuel-gas cooler or the pipe (extraction line) that extracts the fuel gas from the intermediate stage of the fuel-gas compressor and guides it to the fuel-gas cooler.

In the above-described power-generation plant, it is more preferable that a pipe leading to the spray nozzle be provided with a pressure detector for detecting the pressure of the coolant that passes through the pipe.

With such a power-generation plant, it is possible to easily ascertain whether or not the coolant is flowing through the pipe leading to the spray nozzle, that is, whether the coolant is supplied to the spray nozzle or the coolant is supplied to the bypass pipe, and it is possible to prevent forgetting to switch the three-way valve from the spray nozzle side to the bypass pipe side or from the bypass pipe side to the spray nozzle side.

A method of stopping a power-generation plant according to the present invention is a method of stopping a power-generation plant including a gas turbine that combusts fuel gas, a fuel-gas cooler that cools the fuel gas, which is pressurized at a fuel-gas compressor and recirculated, with coolant sprayed from a spray nozzle, and an extraction line that guides the fuel gas extracted from an intermediate stage of the fuel-gas compressor to the fuel-gas cooler, the method including stopping the gas turbine when a level of the coolant accumulated at a bottom portion of the fuel-gas cooler has reached a predetermined level; and stopping a coolant pump, which supplies the coolant to the spray nozzle.

With the method of stopping a power-generation plant according to the present invention, when the level of the coolant accumulated in the hopper has reached the predetermined level (a level set at, for example, vertically above a certain level maintained by a U-shaped pipe (for example, 0 cm above the water surface of the coolant accumulated in the hopper) and vertically below the bottom end of the downstream end of the extraction line (for example, 0 cm below the bottom end of the downstream end of the extraction line)), an emergency shut-off valve that blocks the supply of the fuel gas to the gas turbine is quickly closed (set to the fully-closed state), thus blocking the supply of the fuel gas to the gas turbine. At the same time, the coolant pump is stopped, and, as a result, spraying of the coolant from the spray nozzle is stopped.

Accordingly, the coolant used in the fuel-gas cooler can be prevented from flowing into the fuel-gas compressor and the gas turbine by flowing in reverse through the pipe (extraction line) that extracts the fuel gas from the intermediate stage of the fuel-gas compressor and guides it to the fuel-gas cooler.

The above-described method of stopping a power-generation plant more preferably includes stopping the gas turbine when a level of the coolant accumulated in a bypass line that guides the fuel gas, which is pressurized at the fuel-gas compressor and recirculated, to the fuel-gas cooler has reached a predetermined level; and stopping the coolant pump, which supplies the coolant to the spray nozzle.

With such a method of stopping a power-generation plant, when the level of the coolant accumulated in the bypass line has reached the predetermined level (a level set at, for example, 10 cm above the bottom end of the inner circumferential surface of the gas inlet pipe), for example, an emergency shut-off valve that blocks the supply of the fuel gas to the gas turbine is quickly closed (set to the fully-closed state), thus blocking the supply of the fuel gas to the gas turbine. At the same time, the coolant pump is stopped, and, as a result, spraying of the coolant from the spray nozzle is stopped.

Accordingly, the coolant used in the fuel-gas cooler can be prevented from flowing into the fuel-gas compressor and the gas turbine by flowing in reverse through the pipe (bypass line) that guides the fuel gas pressurized at the fuel-gas compressor to the fuel-gas cooler.

A method of stopping a power-generation plant according to the present invention is a method of stopping a power-generation plant including a gas turbine that combusts fuel gas, a fuel-gas cooler that cools the fuel gas, which is pressurized at a fuel-gas compressor and recirculated, with coolant sprayed from a spray nozzle, and a bypass line that guides the fuel gas, which is pressurized at the fuel-gas compressor and recirculated, to the fuel-gas cooler, the method including stopping the gas turbine when a level of the coolant accumulated in the bypass line has reached a predetermined level; and stopping a coolant pump that supplies the coolant to the spray nozzle.

With the method of stopping a power-generation plant according to the present invention, when the level of the coolant accumulated in the bypass line has reached the predetermined level (a level set at, for example, 10 cm above the bottom end of the inner circumferential surface of the gas inlet pipe), for example, an emergency shut-off valve that blocks the supply of the fuel gas to the gas turbine is quickly closed (set to the fully-closed state), thus blocking the supply of the fuel gas to the gas turbine. At the same time, the coolant pump is stopped, and, as a result, spraying of the coolant from the spray nozzle is stopped.

Accordingly, the coolant used in the fuel-gas cooler can be prevented from flowing into the fuel-gas compressor and the gas turbine by flowing in reverse through the pipe (bypass line) that guides the fuel gas pressurized at the fuel-gas compressor to the fuel-gas cooler.

As has been described above, a power-generation plant according to the present invention affords an advantage in that coolant used in a fuel-gas cooler can be prevented from flowing into a fuel-gas compressor and a gas turbine by flowing in reverse through a pipe (bypass line) that guides fuel gas pressurized at the fuel-gas compressor to the fuel-gas cooler or a pipe (extraction line) that extracts the fuel gas from an intermediate stage of the fuel-gas compressor to guide it to the fuel-gas cooler.

DETAILED DESCRIPTION OF THE INVENTION

{First Embodiment}

A power-generation plant according to a first embodiment of the present invention will be described below with reference to FIG. 1.

Figure 1:
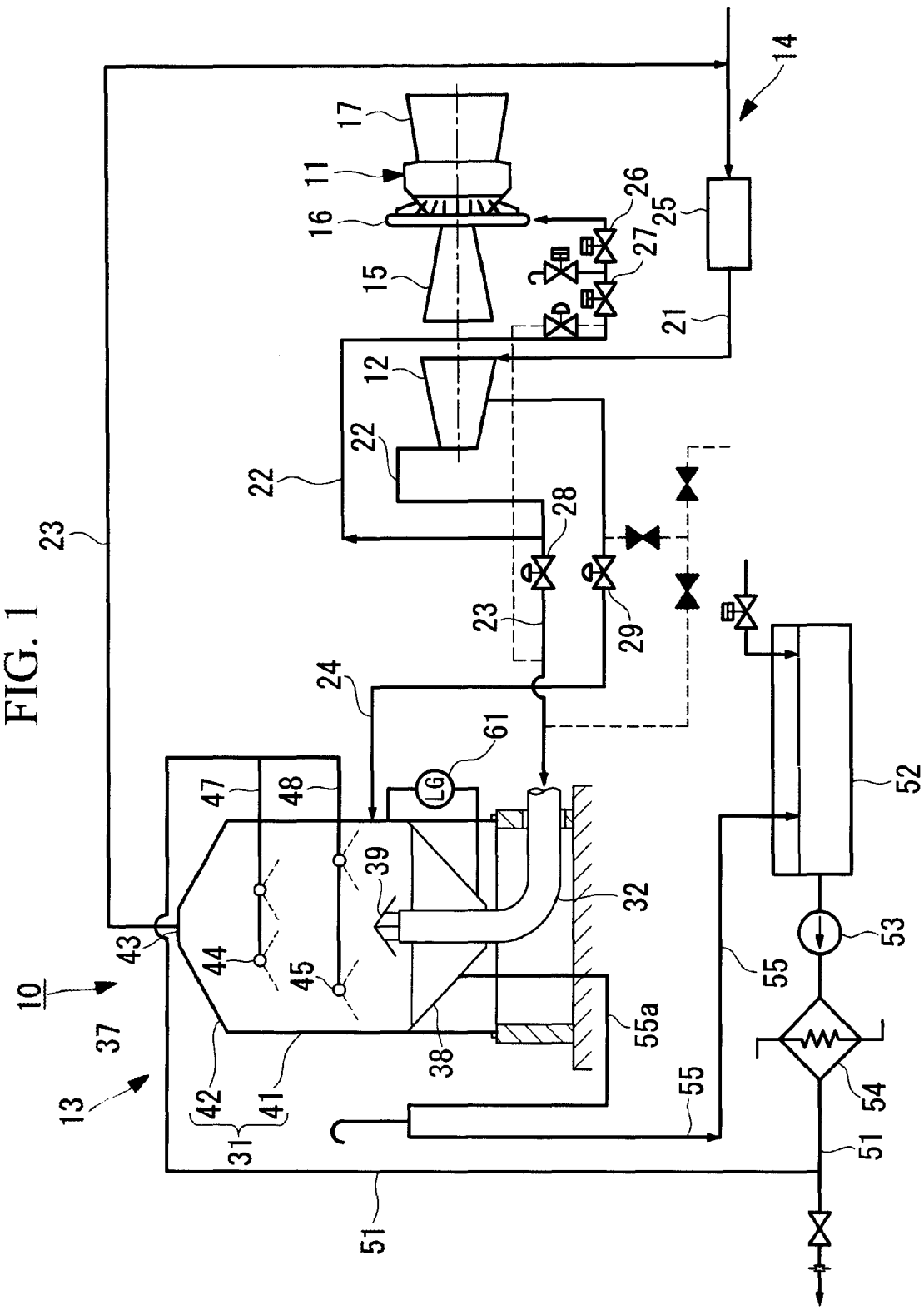
FIG. 1 is a diagram showing, in outline, the configuration of a power-generation plant according to a first embodiment of the present invention.

FIG. 1 is a diagram showing, in outline, the configuration of a power-generation plant according to this embodiment.

As shown in FIG. 1, a power-generation plant 10 according to this embodiment is provided with a gas turbine 11, a BFG compressor 12, which is a fuel-gas compressor, a generator (not shown), a fuel-gas cooler (hereinafter, referred to as "gas cooler") 13, a BFG (blast furnace gas) supply system 14, and a COG (coke oven gas) supply system (not shown).

The gas turbine 11 is provided with an air compressor 15 and (gas-turbine) combustor 16, and a turbine 17. In addition, the gas turbine 11, the BFG compressor 12, and the generator are linked via a decelerating mechanism (not shown), and thus, when the gas turbine 11 is rotated, the BFG compressor 12 and the generator are also rotated.

The BFG supply system 14 is a fuel supply line that guides BFG (low-calorific-value fuel) to a gas nozzle (not shown) that forms a combustor 16; the COG supply system is a fuel supply line that guides COG (high-calorific-value fuel) to a pilot nozzle (not shown) that forms the combustor 16; and the BFG supply system 14 and the COG supply system are connected to the combustor 16 at the downstream ends thereof.

The BFG supply system 14 is provided with an upstream line 12 that guides BFG generated in a blast furnace (not shown) to the BFG compressor 12; a downstream line 22 that guides the BFG that has been compressed at the BFG compressor 12 (sent out (expelled) from the BFG compressor 12) to a gas nozzle; a bypass line 23 that communicates between an intermediate portion of the upstream line 21 and an intermediate portion of the downstream line 22, and that returns the BFG passing through the downstream line 22 to the upstream line 21 as needed; and an extraction line 24 that guides the BFG removed (extracted) from an intermediate stage of the BFG compressor 12 to the gas cooler 13.

A mixer (not shown), which mixes the BFG guided thereto from the blast furnace with cooling $N_2$ and/or heating COG so as to adjust the heat (caloric value) of the BFG to an appropriate level, and a dust collector (for example, electrostatic precipitator) 25, which separates/removes microparticles, such as dust or the like, from the BFG guided from the mixer toward the BFG compressor 12, are provided at intermediate portions of the upstream line 21.

In addition, a shut-off valve 26 and an emergency shut-off valve 27 are provided in intermediate portions of the downstream line 22.

A bypass valve (flow-rate adjusting valve) 28, which adjusts the flow rate of the BFG returned (extracted) from the intermediate portion of the downstream line 22 to the intermediate portion of the upstream line 21 located between the mixer and the dust collector 25, and a gas cooler 13 provided downstream of the bypass valve 28 to cool the BFG, which is returned (extracted) from the intermediate portion of the downstream line 22 to the intermediate portion of the upstream line 21 located between the mixer and the dust collector 25, are provided at intermediate portions of the bypass line 23.

The downstream end (outlet end) of the extraction line 24 is connected to a center portion of a drum section 41 located below spray nozzles 45, described later, and above the top end of a hopper 38; the BFG that has flowed out from the downstream end (outlet end) of the extraction line 24 is horizontally sprayed out toward a longitudinal axis (center axis) of the gas cooler 13; and thus, the BFG flows into the gas cooler 13. In addition, an extraction valve (flow-rate adjusting valve) 29 that adjusts flow rate of the BFG removed (extracted) from the intermediate stage of the BFG compressor 12 is provided at an intermediate portion of the extraction line 24.

The gas cooler 13 is provided with a casing 31, a gas inlet pipe 32, the hopper 38, and a diffuser 39.

The casing 31 is provided with the drum section 41 that has a substantially cylindrical shape extending in the vertical direction and a top portion 42 that has a substantially circular cone shape continuously connected with the drum section 41. A gas outlet 43 is provided at a center portion of the top portion 42, and the bypass line 23 is connected to the gas outlet 43.

The gas inlet pipe 32 is bent from the horizontal direction to the vertical direction directly below the gas cooler 13, and the diffuser 39 for preventing the coolant from directly flowing in from spray nozzles 44 and the spray nozzles 45 is provided at a gas outlet of the gas inlet pipe 32.

The diffuser 39 has an umbrella-like shape that is inclined downward from the center toward the edge so as to cover the gas outlet of the gas inlet pipe 32. Because the coolant sprayed from the spray nozzles 44 and 45 is blocked by the diffuser 39, the coolant does not directly flow into the gas outlet of the gas inlet pipe 32. The coolant sprayed on the diffuser 39 flows over the top surface of the diffuser 39, which serves as a roof, thus flowing into the hopper 38.

The BFG that has flowed out from the gas outlet of the gas inlet pipe 32 is gradually depressurized while passing through an internal space of the drum section 41 from the diffuser 39, and is returned to the intermediate portion of the upstream line 21 by passing through the bypass line 23 after being guided to the gas outlet 43 along an inner wall surface (roof surface) of the top portion 42 are.

In the internal space of the drum section 41, a plurality of spray nozzles 44 are disposed in the form of a ring along a circumferential direction of the drum section 41 and a plurality of spray nozzles 45 are disposed in the form of a ring along the circumferential direction of the drum section 41. The spray nozzles 44 are disposed closer to the gas outlet 43 than the spray nozzles 45.

A coolant supply pipe 51 is a pipe for individually guiding the coolant to the plurality of spray nozzles 44 and the plurality of spray nozzles 45. The BFG passing through the drum section 41 is cooled first by liquid sprayed from the spray nozzles 45 in the form of a mist via a second branch pipe 48, moves toward the gas outlet 43, and is then cooled further by liquid sprayed from the spray nozzles 44 in the form of a mist via a first branch pipe 47. In addition, a coolant pump 53 and a cooler 54 are provided at intermediate portions of the coolant supply pipe 51 closer to an upstream side.

The hopper 38 is disposed at a lower potion (bottom portion) of the drum section 41 along the longitudinal axis (center axis) of the gas cooler 13 and vertically below the diffuser 39; is a funnel-like member having a substantially circular cone shape whose diameter gradually decreases from one end (top end) to the other end (bottom end); recovers the coolant that has been sprayed from the spray nozzles 44 and 45, used to cool the BFG, and then dripped; and accumulates the coolant to a certain level. In addition, a coolant return pipe 55 that (naturally) returns, of the coolant accumulated in the hopper 38, the coolant that exceeds the certain level to a coolant pit 52 is provided at a bottom portion of the hopper 38.

Note that a U-shaped tube 55a provided at the most upstream portion of the coolant return pipe 55 (naturally) maintains the level of the coolant that accumulates in the hopper 38 at the certain level.

In addition, with the coolant accumulated in the U-shaped tube 55a, the interior of the gas cooler 13, the interior of the coolant return pipe 55 located downstream of the U-shaped pipe 55a, and the interior of the coolant pit 52 are partitioned (water sealed) so that the BFG that passes through the gas cooler 13 is prevented from flowing into the coolant pit 52 and the coolant return pipe 55 located downstream of the U-shaped pipe 55a.

The gas cooler 13 according to this embodiment is provided with a (first) level detector (level gauge) 61 that detects the level of the coolant accumulated in the hopper 38 when it reaches a predetermined level, which is set above the certain level in the vertical direction (for example, 0 cm above the water surface of the coolant accumulated in the hopper 38) and also vertically below the bottom end of the downstream end of the extraction line 24 (for example, 0 cm below the bottom end of the downstream end of the extraction line 24).

In addition, when the level detector 61 detects that the level of the coolant in the hopper 38 has reached the predetermined level set vertically above the certain level, a detection signal is output to a controller (not shown) from the level detector 61, and the controller outputs a command signal to the emergency shut-off valve 27. Then, the emergency shut-off valve 27, when the command signal is input thereto from the controller, is quickly closed (set to the fully-closed state) so as to block the supply of the BFG to the combustor 16. At the same time, the controller also outputs a command signal to an emergency shut-off valve (not shown) provided in the COG supply system. Then, the emergency shut-off valve, when the command signal is input thereto from the controller, is quickly closed (set to the fully-closed state) so that the supply of the COG to the combustor 16 is also blocked. As a result, the supply of fuel (BFG and COG) to the combustor 16 is blocked so that the gas turbine 11 is tripped (set to an emergency stop).

Furthermore, when the controller outputs the command signals to the emergency shut-off valve 27 provided in the BFG supply system 14 and the emergency shut-off valve (not shown) provided in the COG supply system, the controller simultaneously outputs a command signal also to the coolant pump 53 so that the coolant pump 53 is stopped. As a result, the supply of the coolant to the coolant supply pipe 51 is stopped so that spraying of the coolant from the spray nozzles 44 and 45 is stopped.

With the power-generation plant 10 according to this embodiment, when the level detector 61 detects that the level of the coolant accumulated in the hopper 38 has reached the predetermined level (a level set at, for example, vertically above (for example, 0 cm above the liquid surface of the coolant accumulated in the hopper 38) the certain level maintained by the U-shaped pipe 55a and vertically below the bottom end of the downstream end of the extraction line 24 (for example, 0 cm below the bottom end of the downstream end of the extraction line 24)), the detection signal is output from the level detector 61 to the controller, and the command signal is output from the controller to the emergency shut-off valve 27 that blocks the supply of the fuel gas to the gas turbine 11. Then, the emergency shut-off valve 27, when the command signal is input there to from the controller, is quickly closed (set to the fully-closed state), thus blocking the supply of the fuel gas to the gas turbine 11. At the same time, the controller also outputs the command signal to the coolant pump 53 so that the coolant pump 53 is stopped, and, as a result, spraying of the coolant from the spray nozzles and 44 and 45 is stopped.

Accordingly, the coolant used in the gas cooler 13 can be prevented from flowing into the gas compressor 12 and the gas turbine 11 by flowing in reverse through the extraction line 24 that extracts the fuel gas from the intermediate stage of the gas compressor 12 and guides the fuel gas to the gas cooler 13.

{Second Embodiment}

A power-generation plant according to a second embodiment of the present invention will be described below with reference to FIG. 2.

Figure 2:
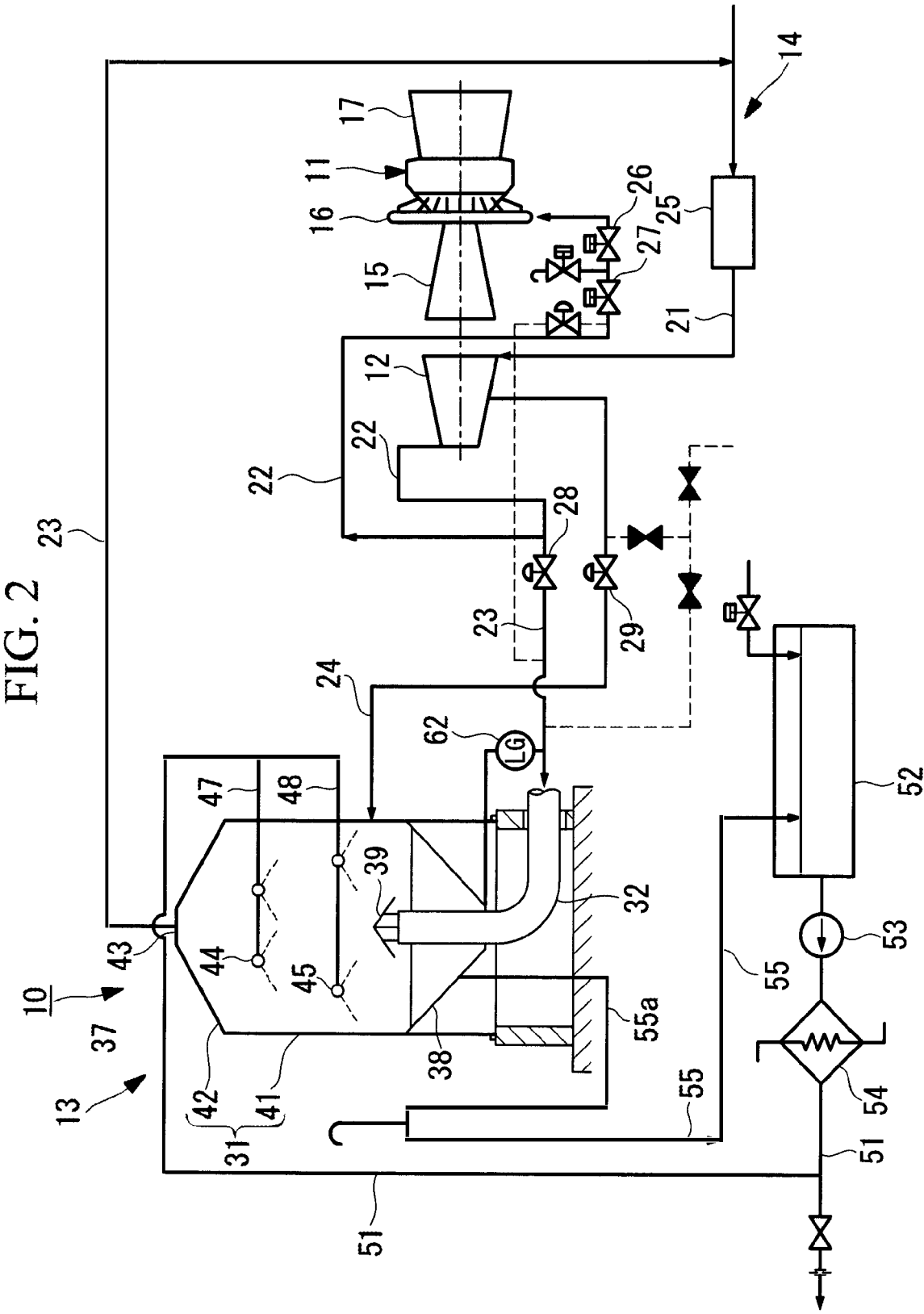
FIG. 2 is diagram showing, in outline, the configuration of a power-generation plant according to a second embodiment of the present invention.

FIG. 2 is a diagram showing, in outline, the configuration of a power-generation plant according to this embodiment.

As shown in FIG. 2, a gas cooler 13 according to this embodiment differs from that of the first embodiment described above in that a (second) level detector (level gauge) 62 is provided instead of the (first) level detector (level gauge) 61. Because other constituent components are the same as those in the first embodiment described above, descriptions of those constituent components will be omitted herein. Note that the same reference signs are given to members that are the same as those in the above-described first embodiment.

The gas cooler 13 according to this embodiment is provided with the (second) level detector (level gauge) 62 that, in the case in which the coolant has accumulated inside the gas inlet pipe 32, detects that the level thereof has reached a predetermined level (which is set, for example, 0 cm above a bottom end of an inner circumferential surface of the gas inlet pipe 32).

In addition, in this embodiment, when the level detector 62 detects that the level of the coolant accumulated in the gas inlet pipe 32 has reached the predetermined level (which is set, for example, 10 cm above the bottom end of the inner circumferential surface of the gas inlet pipe 32), the level detector 62 outputs a detection signal to a controller (not shown), and the controller outputs a command signal to the emergency shut-off valve 27. Then, the emergency shut-off valve 27, when the command signal is input thereto from the controller, is quickly closed (set to the fully-closed state), thus blocking the supply of the BFG to the combustor 16. At the same time, the controller also outputs the command signal to the emergency shut-off valve (not shown) provided in the COG supply system. Then, the emergency shut-off valve, when the command signal is input thereto from the controller, is quickly closed (set to the fully-closed state), thus blocking the supply of the COG to the combustor 16. As a result, the supply of fuel (BFG and COG) to the combustor 16 is blocked so that the gas turbine 11 is tripped (set to an emergency stop).

Furthermore, when the controller outputs the command signals to the emergency shut-off valve 27 provided in the BFG supply system 14 and the emergency shut-off valve (not shown) provided in the COG supply system, the controller simultaneously outputs the command signal also to the coolant pump 53 so that the coolant pump 53 is stopped. As a result, the supply of the coolant to the coolant supply pipe 51 is stopped so that spraying of the coolant from the spray nozzles 44 and 45 is stopped.

With the power-generation plant 10 according to this embodiment, when the level detector 62 detects that the level of the coolant accumulated in the gas inlet pipe 32 has reached the predetermined level (a level set at, for example, 10 cm above the bottom end of the inner circumferential surface of the gas inlet pipe 32), the detection signal is output from the level detector 62 to the controller, and the command signal is output from the controller to the emergency shut-off valve 27 that blocks the supply of the fuel gas to the gas turbine 11. Then, the emergency shut-off valve 27, when the command signal is input thereto from the controller, is quickly closed (set to the fully-closed state), thus blocking the supply of the fuel gas to the gas turbine 11. At the same time, the controller also outputs the command signal to the coolant pump 53 so that the coolant pump 53 is stopped, and, as a result, spraying of the coolant from the spray nozzles and 44 and 45 is stopped.

Accordingly, the coolant used in the gas cooler 13 can be prevented from flowing into the gas compressor 12 and the gas turbine 11 by flowing in reverse through the bypass line 23 that guides the fuel gas pressurized at the gas compressor 12 to the gas cooler 13.

{Third Embodiment}

A power-generation plant according to a third embodiment of the present invention will be described below with reference to FIG. 3.

Figure 3:
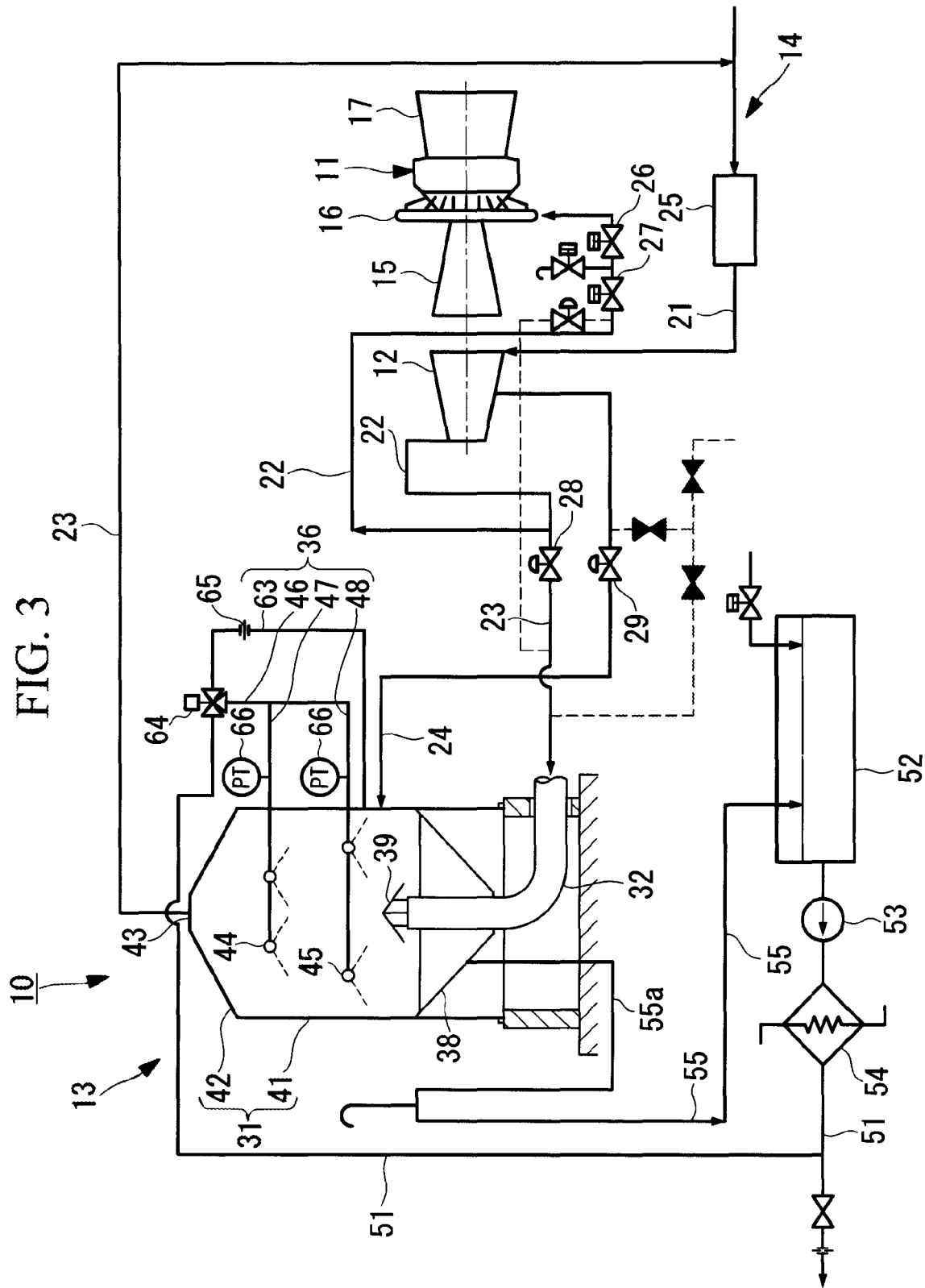
FIG. 3 is diagram showing, in outline, the configuration of a power-generation plant according to a third embodiment of the present invention.

FIG. 3 is a diagram showing, in outline, the configuration of a power-generation plant according to this embodiment.

As shown in FIG. 3, a gas cooler 13 according to this embodiment differs from those of the embodiments described above in that a coolant pipe 36 that includes a bypass pipe 63 is provided and that the (first) level detector (level gauge) 61 and the (second) level detector (level gauge) 62 are omitted. Because other constituent components are the same as those in the embodiments described above, descriptions of those constituent components will be omitted herein.

Note that the same reference signs are given to members that are the same as those in the above-described embodiments.

The coolant pipe 36 of the gas cooler 13 according to this embodiment is provided with the bypass pipe 63 that returns the coolant to the hopper 38 without passing it through the first branch pipe 47 and the second branch pipe 48 (that is, so that the coolant is not sprayed from the spray nozzles 44 and 45).

An upstream end (inlet end) of the bypass pipe 63 is connected, via a three-way valve 64, to a main pipe 46 located upstream of a position where an upstream end (inlet end) of the first branch pipe 47 is connected, and an orifice 65, which causes (generates) the same level of pipe resistance as when the coolant is sprayed from the spray nozzles 44 and 45, is provided at an intermediate portion of the bypass pipe 63. In addition, a downstream end (outlet end) of the bypass pipe 63 is connected to a center portion of the drum section 41 located below the spray nozzles 45 and above the downstream end (outlet end) of the extraction line 24, and the coolant that has flowed out from the downstream end (outlet end) of the bypass pipe 63 is horizontally expelled toward the longitudinal axis (center axis) of the gas cooler 13 so as to flow into the gas cooler 13 and is subsequently accumulated in the hopper 38. Specifically, the coolant circulates in the following order: the coolant pit 52→the coolant supply pipe 51→the coolant pump 53→the coolant supply pipe 51→the cooler 54→the cooler supply pipe 51→the main pipe 46→the bypass pipe 63→the hopper 38→the U-shaped pipe 55a→the coolant return pipe 55→the coolant pit 52.

With the power-generation plant 10 according to this embodiment, even in the case in which, in cold regions, etc., the power-generation plant 10 is in a stopped state and the outdoor temperature reaches 0° C. or below, the coolant pump 53 is operated without spraying the coolant from the spray nozzles 44 and 45, and thus, the coolant is circulated.

Accordingly, the coolant used in the gas cooler 13 can be prevented from freezing while suppressing the occurrence of droplets in the gas cooler 13.

In addition, by suppressing the occurrence of droplets in the gas cooler 13, the coolant can be prevented from flowing into the gas compressor 12 and the gas turbine 11 by flowing in reverse through the bypass line 23 that guides the fuel gas pressurized at the gas compressor 12 to the gas cooler 13 or the extraction line 24 that extracts the fuel gas from the intermediate stage of the gas compressor 12 and guides it to the gas cooler 13.

Note that, in this embodiment, it is more preferable that the first branch 47 and the second branch pipe 48 be individually provided with pressure detectors 66 that detect the pressure of the coolant that passes through the pipes.

By doing so, it is possible to easily ascertain whether or not the coolant is flowing through the first branch pipe 47 and the second branch pipe 48, that is, which side the three-way vale 64 is switched (set) to (whether the three-way valve 64 is set to a side that supplies the coolant to the spray nozzles 44 and 45 or to a side that makes the coolant circulate via the bypass pipe 63), and it is possible to prevent the three-way valve 64 from accidentally being left unswitched.

Note that the present invention is not limited to the embodiments described above, and appropriate modifications/alterations are possible as needed.

For example, the first embodiment and the second embodiment described above may be combined, or the second embodiment and the third embodiment described above may be combined, and, in addition, the first embodiment to the third embodiment may all be combined.

In addition, although the embodiments described above have been described with COG (coke oven gas) as a concrete example of high-calorific value fuel and BFG (blast furnace gas) as a concrete example of low-calorific-value fuel, the types of fuel may be fuel other than COG (coke oven gas) and BFG (blast furnace gas), for example, process gases that are by-products produced from various plants (such as LDG (Linz-Donawitz converter gas), MXG (mixed by-product gas), and so forth).

What is claimed is:

1. A power-generation plant comprising:
   a gas turbine that combusts fuel gas;
   a fuel-gas cooler that cools the fuel gas, which is pressurized at a fuel-gas compressor and recirculated, with coolant sprayed from a spray nozzle;
   an extraction line that guides the fuel gas extracted from an intermediate stage of the fuel-gas compressor to the fuel-gas cooler;
   a first level detector that detects whether a level of the coolant accumulated at a bottom portion of the fuel-gas cooler has reached a predetermined level; and
   a controller configured to stop the gas turbine on the basis of a detection signal sent from the first level detector and that outputs a command signal for stopping a coolant pump that supplies the coolant to the spray nozzle.

2. A power-generation plant according to claim 1, further comprising:
   a bypass line that guides the fuel gas, which is pressurized at the fuel-gas compressor and recirculated, to the fuel-gas cooler;
   a second level detector that detects whether a level of the coolant accumulated in the bypass line has reached a predetermined level; and
   a controller that stops the gas turbine on the basis of a detection signal sent from the second level detector and that outputs a command signal for stopping the coolant pump that supplies the coolant to the spray nozzle.

3. A power-generation plant according to claim 1, further comprising:
   a coolant pipe that supplies the coolant to the spray nozzle,
   wherein the coolant pipe is provided with a bypass pipe that returns the coolant to the interior of the fuel-gas cooler by bypassing the spray nozzle.

4. A power-generation plant according to claim 3, wherein a pipe leading to the spray nozzle is provided with a pressure detector for detecting the pressure of the coolant that passes through the pipe.

5. A method of stopping a power-generation plant including
   a gas turbine that combusts fuel gas;
   a fuel-gas cooler that cools the fuel gas, which is pressurized at a fuel-gas compressor and recirculated, with coolant sprayed from a spray nozzle; and
   an extraction line that guides the fuel gas extracted from an intermediate stage of the fuel-gas compressor to the fuel-gas cooler,
   the method comprising:
   stopping the gas turbine when a level of the coolant accumulated at a bottom portion of the fuel-gas cooler has reached a predetermined level; and
   stopping a coolant pump, which supplies the coolant to the spray nozzle.

6. A method of stopping a power-generation plant according to claim 5, further comprising:
   stopping the gas turbine when a level of the coolant accumulated in a bypass line that guides the fuel gas, which is pressurized at the fuel-gas compressor and recirculated, to the fuel-gas cooler has reached a predetermined level; and
   stopping the coolant pump, which supplies the coolant to the spray nozzle.

* * * * *